D. M. BLISS.
METHOD AND MEANS FOR REDUCING SPARKING IN ELECTRICAL APPARATUS.
APPLICATION FILED AUG. 30, 1911.
1,116,871. Patented Nov. 10, 1914.
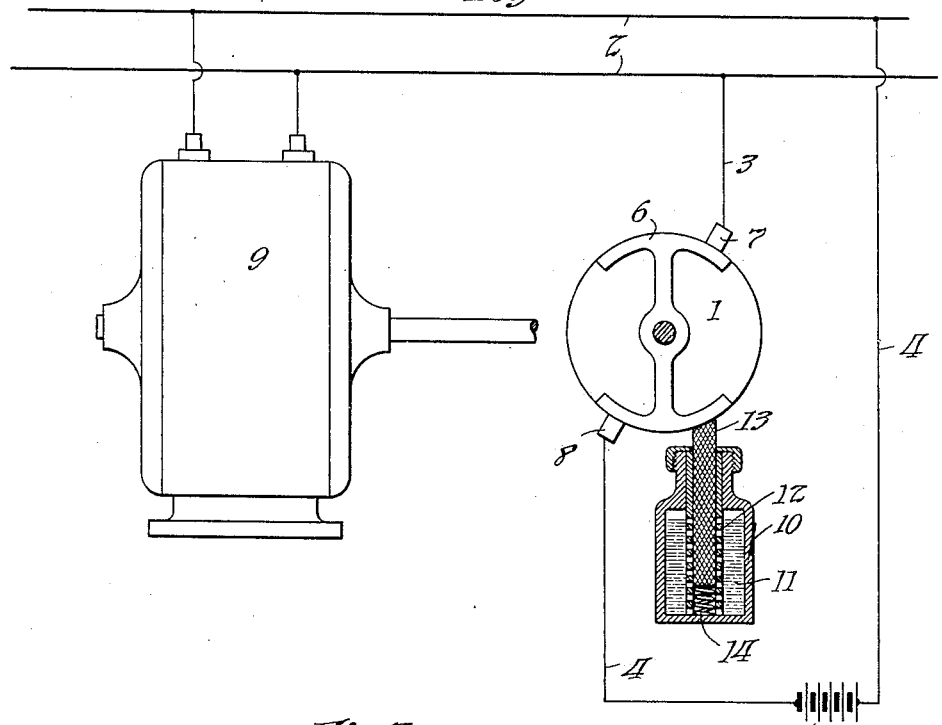
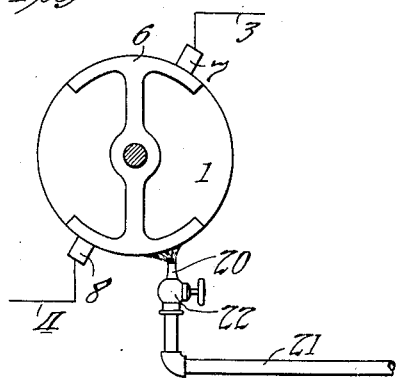

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

METHOD AND MEANS FOR REDUCING SPARKING IN ELECTRICAL APPARATUS.

1,116,871. Specification of Letters Patent. Patented Nov. 10, 1914.

Application filed August 30, 1911. Serial No. 646,883.

*To all whom it may concern:*

Be it known that I, DONALD M. BLISS, a subject of the King of Great Britain, and a resident of West Orange, in the county of Essex and State of New Jersey, have invented certain new and useful Improvements in Methods and Means for Reducing Sparking in Electrical Apparatus, of which the following is a specification.

My invention relates to a method and means for improving the commutation of dynamos, motors, rotating switches and circuit-breakers and is applicable to both alternating and direct current systems.

The object of my invention is the production of a simple, inexpensive, and effective method and means for reducing or preventing the sparking which usually occurs to a greater or less degree in all apparatus of this class. It is particularly useful in connection with devices for rectifying alternating current in which switches or commutators are rotated relatively to brushes coöperating therewith and in synchronism with the current to be rectified.

It is well known that there is a shifting or variation of the zero or neutral point of the current wave on a rectifying commutator, due to various changes in the alternating supply circuit and in the operation of the motor. This shifting causes sparking at the connecting brushes. Many plans have been proposed to correct this defect, such as automatic shifting of the brushes, adjustment of circuit conditions by variable inductance, mechanical adjustment or shifting of the commutator, etc. All of these have proved unsatisfactory in actual service.

I have found that if a thin coating or film of easily vaporizable fluid, such as water, is continually applied to such a commutator, sparking will be absolutely prevented within certain well defined limits, and that a rectifying commutator, which, when running dry, would be subject to destructive sparking and flashing, will operate sparklessly when the commutator is kept thoroughly moistened or a stream of water directed on the commutator, and that under such conditions the commutator will operate sparklessly, notwithstanding any periodic or irregular shifting of the zero point of the alternating current wave which is being rectified by such a commutator. While any easily vaporizable conducting liquid may be employed for this purpose, I prefer to use water, and in the practice of my invention I may apply the liquid as shown in the accompanying drawings which form a part of this specification, and in which—

Figure 1 is a view partly diagrammatic of one form of apparatus illustrating my invention; and Fig. 2 is a similar view illustrating a modification.

Similar reference characters indicate similar parts throughout the several views.

Referring to the drawings, the rectifying commutator 1 is connected across the alternating current mains 2 by means of conductors 3, 4, and serves to supply unidirectional current to a direct current translating device, such as the battery 5, connected in the circuit 3, 4. The rectifying commutator comprises a conducting portion or switch 6 rotatably mounted and provided with brushes 7 and 8 which are connected with the circuit 3, 4. The rectifying commutator is driven in synchronism with the alternating current to be rectified by any suitable means, as, for example, the synchronous motor 9. By this means a circuit is established from the alternating current mains through the direct current translating device during alternate half waves of the alternating current, and this circuit is broken during the remaining half waves.

In order to reduce the sparking which has a tendency to take place as the brushes leave the conducting segments, a thin film of easily vaporizable conducting liquid, such as water, is applied over the face of the commutator. This film is vaporized under the brushes at the point of contact, where the current density or heat is greatest, that is, the point at which sparking would normally occur. The vaporization of the film of water by the current at this point cools the conducting members at their contact surface so rapidly and effectively that the temperature of the commutator and the brush is kept below the vaporizing point of the metal or brush, and thus sparks or arcs are prevented from forming.

As a means for applying the liquid to the contact surface, I have illustrated in Fig. 1 a vessel 10 containing a suitable liquid 11, such as water, and provided with a vertically extending perforated tube 12, in which is contained a wick or strip of absorbent material 13, such as felt, having one end in communication with the liquid in the vessel through the perforations in the tube 12. A spring 14 may be provided for pressing the wick against the commutator surface.

In Fig. 2 of the drawings I have shown another means for applying the thin film of liquid to the face of the commutator, consisting of a nozzle 20 attached to a supply pipe 21, and adapted to spray the liquid on the commutator face. A valve 22 may be provided for controlling the rate of supply of the liquid.

Having now described my invention, what I claim and desire to secure by Letters Patent of the United States is as follows:—

1. In electrical apparatus having a circuit breaking contact member, the method of reducing sparking upon breaking the circuit, which consists in maintaining said member cooled below its vaporizing point by applying a thin film of easily and completely vaporizable liquid over the contact surface thereof and vaporizing said film, substantially as set forth.

2. In electrical apparatus having circuit breaking contact members, the method of reducing sparking between said members when breaking circuit which consists in applying a thin film of easily and completely vaporizable conducting liquid between said members and over their contact surfaces and vaporizing said film, substantially as set forth.

3. In apparatus of the class described, the combination with a commutator segment and a brush coöperating therewith, of means for applying a film of easily and completely vaporizable conducting liquid between the commutator segment and brush, whereby said commutator segment and brush are maintained at a temperature below the vaporizing point of the segment and brush during operation, substantially as described.

4. In apparatus of the class described, the combination with commutator segments and brushes coöperating therewith, of means for spraying a liquid upon the contact surfaces of the commutator segments, substantially as described.

This specification signed and witnessed this 26th day of August 1911.

DONALD M. BLISS.

Witnesses:
J. ALMER HEDDEN,
HENRY LANAHAN.